(12) United States Patent
Housen et al.

(10) Patent No.: US 7,945,388 B2
(45) Date of Patent: May 17, 2011

(54) TEST BED FOR IN-SITU STUDIES

(75) Inventors: Kevin Richard Housen, Tacoma, WA (US); Nikhil Kanuru Rao, Tukwila, WA (US); William John Koch, IV, Bellevue, WA (US)

(73) Assignee: The Boeing Company, Chicago, IL (US)

(*) Notice: Subject to any disclaimer, the term of this patent is extended or adjusted under 35 U.S.C. 154(b) by 17 days.

(21) Appl. No.: 12/145,836

(22) Filed: Jun. 25, 2008

(65) Prior Publication Data

US 2009/0326822 A1      Dec. 31, 2009

(51) Int. Cl.
*G01W 1/00* (2006.01)
(52) U.S. Cl. ............................................................ 702/3
(58) Field of Classification Search .................. 702/2, 3, 702/FOR. 100, 4
See application file for complete search history.

(56) References Cited

U.S. PATENT DOCUMENTS

| | | | |
|---|---|---|---|
| 3,582,692 A | | 6/1971 | Palini |
| 4,338,575 A | * | 7/1982 | Hartemann ................ 331/65 |
| 4,394,575 A | * | 7/1983 | Nelson ...................... 250/343 |
| 4,742,327 A | * | 5/1988 | Burgess et al. .......... 340/426.36 |
| 4,904,894 A | * | 2/1990 | Henry et al. .............. 310/328 |
| 4,984,498 A | | 1/1991 | Fishman |
| 5,402,667 A | | 4/1995 | Atkinson et al. |
| 5,455,625 A | * | 10/1995 | Englander .................. 348/375 |
| 5,661,303 A | | 8/1997 | Teder |
| 5,811,680 A | | 9/1998 | Galili et al. |
| 7,197,940 B2 | | 4/2007 | Ziebart et al. |
| 7,249,502 B2 | | 7/2007 | Luukkala et al. |
| 7,331,133 B2 | * | 2/2008 | Bauernfeind ................ 40/600 |
| 7,479,727 B1 | | 1/2009 | Grace |
| 7,575,086 B2 | * | 8/2009 | Kamei et al. ................ 180/274 |
| 2004/0226386 A1 | * | 11/2004 | Gysling et al. ............. 73/861.42 |

OTHER PUBLICATIONS

Gaul et al., "Determination of the impact force on a plate by piezo-electric film sensors", Archive of Applied Mechanics, vol. 69, 691-701 (1999).*
Hubbert, J, V N Bringi, and L D Carey, "CSU-CHILL Polarimetric Radar Measurements from a Severe Hail Storm in Eastern Colorado", J. Appl. Meteorology, v. 37, pp. 749-775 (Aug. 1999).*
The pdf Kourounis file: Storm Chaser Technology by George Kourounis at http://web.archive.org/20050101-20041201re_/http://www.stormchaser.ca/Gear.html (Dec. 2004 to Jan. 2005).*
Hubbert, J, V. N. Bringi, and L. D. Carey, CSU-CHILL Polarimetric Radar Measurements from a Severe Hail Storm in Eastern Colorado, Jour. Appl. Meteorology, v. 37, Aug. 1998.*
Hubbert et al., "CSU-CHILL Polarimetric Radar Measurements from a Severe Hail Storm in Eastern Colorado", Journal of Applied Meteorology, vol. 37, Aug. 1998, pp. 749-775. Reges et al., "The Community Collaborative Rain, Hail and Snow Network (COCORAHS)—Informal Atmospheric Science in the Community: What can We Accomplish?", retrieved on Apr. 24, 2008.
USPTO Office Action for U.S. Appl. No. 12/179,768 dated May 14, 2010.
USPTO Final office action for U.S. Appl. No. 12/179768 dated Nov. 26, 2010.

* cited by examiner

*Primary Examiner* — Mohamed Charioui
(74) *Attorney, Agent, or Firm* — Yee & Associates, P.C.; Sean M. Casey

(57) ABSTRACT

An impact test system for collecting hail storm data comprises a vehicle, a video recorder, a container, a plurality of dynamic force sensors, an atmospheric instrument system, a mounting fixture, and a data processing system. The plurality of dynamic force sensors is capable of detecting force generated by an impact of an object. The plurality of markers is capable of being used to determine an orientation of an incoming object. The mounting fixture is capable of holding a test specimen. The data processing system is capable of collecting data from the plurality of dynamic force sensors, the atmospheric instrument system, and the video recorder.

11 Claims, 5 Drawing Sheets

TEST BED FOR IN-SITU STUDIES

BACKGROUND INFORMATION

1. Field

The present disclosure relates generally to impact testing and in particular to a method and apparatus for in-situ measurement of impacts caused by hail stones.

2. Background

Hail is a form of precipitation and may include balls or irregular lumps of ice. Hail is also referred to as hail stones. Hail stones may form in clouds when super-cooled water droplets freeze on contact with condensation nuclei, such as dust. Up drafts in the storm may blow or push hail stones to the upper part of the cloud. The hail stones may then fall down when the up draft dissipates. This cycle may occur a number of times with the hail stone, gaining a layer of ice each time the hail stone ascends.

Hail stones may cause damage to a number of different man made objects such as houses, office buildings, cars, trucks, aircraft, and other man made objects. With respect to aircraft, the type of materials, thickness of materials, and other parameters with respect to materials for an exterior portion of the aircraft may include consideration as to how these materials may react when hail stones impact different parts on the aircraft. These parts include, for example, without limitation, a windshield, a wing panel, an aileron, a jet engine inlet, a fuselage, and other suitable exterior components of an aircraft.

In designing these and other components for an aircraft, projections may be made to provide some minimum gauge or thickness to take in to account hail stone impacts on those components. Currently, in identifying minimum thicknesses for components, simulations are used to predict how these components will be affected by impacts caused by hail stones.

One currently used method employs rubber balls to simulate the impact of hail stones. Other currently used methods may simulate hail stone impacts by using a composite ice ball, such as cotton with frozen water. Another approach may use lead or steel balls to simulate hail. These different types of simulations provide some ability to predict the effects of strikes or impacts caused by hail stones. The use of simulated hail stones, such as rubber balls and man made hail stones, provide useful information for designing aircraft parts. These currently used methods are useful, but are only rough simulations of hail stone impacts.

As a result, different designs for aircraft parts may over compensate for the effects of hail stone impacts. Therefore, it would be advantageous to have a method and apparatus that overcomes the problems described above.

SUMMARY

In one advantageous embodiment, an impact test system for collecting hail storm data comprises a vehicle, a video recorder, a container, a plurality of dynamic force sensors, an atmospheric instrument system, a mounting fixture, and a data processing system. The plurality of dynamic force sensors is capable of detecting force generated by an impact of an object on the plurality of dynamic force sensors. The plurality of markers is capable of being used to determine an orientation of an incoming object. The mounting fixture is capable of holding a test specimen. The data processing system is capable of collecting data from the plurality of dynamic force sensors, the atmospheric instrument system, and the video recorder.

In another advantageous embodiment, an apparatus comprises a test bed and a plurality of dynamic force sensors mounted on the test bed.

In still another advantageous embodiment, a method is present for collecting hail storm data. A vehicle is placed in a hail storm. The vehicle has a video recorder capable of capturing video of hail during the hail storm; a container capable of holding a set of hail stones from the hail storm; a plurality of dynamic force sensors capable of detecting force generated by an impact of a hail stone from the hail storm; an atmospheric instrument system; a plurality of markers capable of being used to determine an orientation of an incoming hail stone from the hail storm; a mounting fixture capable of holding a test specimen; and a data processing system. Data measured by the plurality of dynamic force sensors, the atmospheric instrument system, and the video recorder is collected using the data processing system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
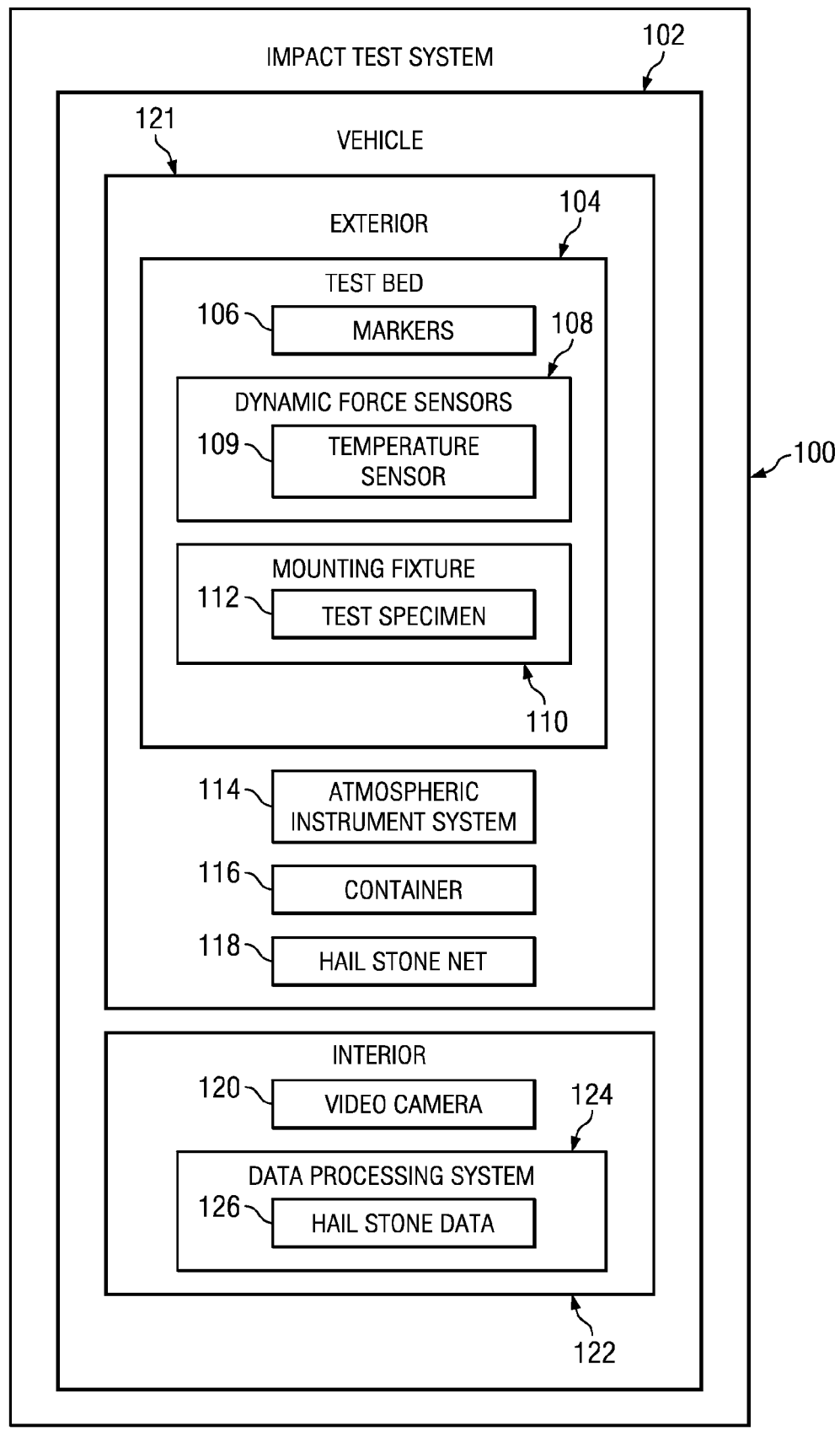
FIG. 1 is a diagram of a impact test system in accordance with an advantageous embodiment.

With reference now to the figures and in particular with reference to FIG. 1, a diagram of an impact test system is depicted in accordance with an advantageous embodiment. Impact test system 100 may be used to collect hail stone data. In particular, impact test system 100 is an example of an in-situ system. In other words, impact test system 100 may collect data about the impact of hail stones in the location of an actual storm in which hail stones are generated and precipitate to impact the ground and other objects.

In this example, impact test system 100 comprises vehicle 102. Vehicle 102 includes test bed 104, markers 106, dynamic force sensors 108, temperature sensor 109, mounting fixture 110, test specimen 112, atmospheric instrument system 114, container 116, hail stone net 118, video camera 120, and data processing system 124, in these examples. Test bed 104, markers 106, dynamic force sensors 108, mounting fixture 110, test specimen 112, atmospheric instrument system 114, container 116, and hail stone net 118 are mounted on exterior 121 of vehicle 102. Video camera 120 and data processing system 124 are located in interior 122 of vehicle 102.

In this illustrative embodiment, markers 106, dynamic force sensors 108, and mounting fixture 110 are located on test bed 104. Test bed 104, in these examples, may be mounted in different locations on vehicle 102. For example, test bed 104 may be located on the hood, the roof, or some other portion of vehicle 102 that provides exposure to hail stones that may fall during a storm. Test bed 104 may be a platform having a planer surface for markers 106, dynamic force sensors 108, and mounting fixture 110.

Markers 106 may also be referred to as yard markers in some implementations. Markers 106 may be used to identify the orientation of incoming hail stones. In these illustrative examples, markers 106 may take the form of lines that form a grid or sections on test bed 104.

Dynamic force sensors 108 are located within and/or among markers 106, in these examples, and may generate measurements of force on a dynamic basis. In other words, a sensor within dynamic force sensors 108 may generate data identifying the amount of force a hail stone generates over time in response to an impact that occurs on dynamic force sensors 108.

Test specimen 112 is mounted and/or connected to mounting fixture 110 in these examples. Test specimen 112 may take various forms. For example, test specimen 112 may be a composite test specimen. As yet another example, test specimen 116 may be a flat composite test specimen and/or a composite structure with contours. In yet other embodiments, test specimen 116 may be, for example, an aluminum panel or structure. These different test specimens may have different gauges or thicknesses to provide data on the effect of hail-storms on test specimen 112.

Atmospheric instrument system 114 contains a set of atmospheric instruments. A set, as used herein, is one or more items. For example, a set of atmospheric instruments is one or more atmospheric instruments. Atmospheric instrument system 114 may generate data about the atmosphere during a hail storm. Atmospheric instrument system 114 may measure parameters such as, for example, temperature, pressure, humidity, wind speed, wind direction, and/or other suitable parameters about the atmosphere.

Container 116 may hold hail stones that have precipitated or fallen. These hail stones may be examined to identify the composition, shape, size, and other parameters about the hail stones. Hail stone net 118 may catch hail stones in a manner that reduces and/or minimizes the damage to the hail stones. In this manner, intact hail stones may be collected and studied.

Video camera 120 may be directed towards test bed 104 in a manner to record video of hail stones that impact on test bed 104. The video of the impact of hail stones may be analyzed to identify speed and orientation or angles at which hail stones impact test bed 104. The orientation may be identified by using markers 106 within the video.

Data processing system 124 may collect data generated by dynamic force sensors 108, atmospheric instrument system 114, and/or video camera 120. This data may be correlated using time stamps, such that the information from different systems may be analyzed. Data processing system 124 saves these measurements as hail stone data 126. This information may then be transmitted for analysis. In other advantageous embodiments, the analysis may be performed by data processing system 124.

The illustration of impact test system 100 is not intended to limit the manner in which impact test systems may be implemented. The different components illustrated and described are functional components and not meant to provide physical or architectural limitations to the manner in which various components may be implemented.

For example, other components may be used in addition to or in place of the one illustrated for impact test system 100. In one illustrative example, temperature sensor 109 also may be included in impact test system 100. Temperature sensor 109 may be located on or integrated into dynamic force sensors 108. In this manner, information about the temperature of hail stones that impact dynamic force sensors 108 also may be collected.

Container 116, in some implementations, may be located on test bed 104. In yet other advantageous embodiments, mounting fixture 110 may be located on another portion of exterior 121 other than test bed 104. In still other advantageous embodiments, multiple mounting fixtures may be used or mounting fixture 110 may be capable of holding multiple test specimens. In the advantageous embodiments, vehicle 102 may take various forms. For example, vehicle 102 may be a truck, a utility vehicle, a van, a boat, an aircraft, or some other suitable vehicle.

Test impact system 100 in other embodiments may use an un-powered vehicle, such as a trailer. When vehicle 102 takes the form of a trailer, the trailer may be towed by another vehicle into a storm or other area near a storm and left to collect data. In other advantageous embodiments, impact test system 100 may be positioned in a location without any association with a vehicle.

Figure 2:
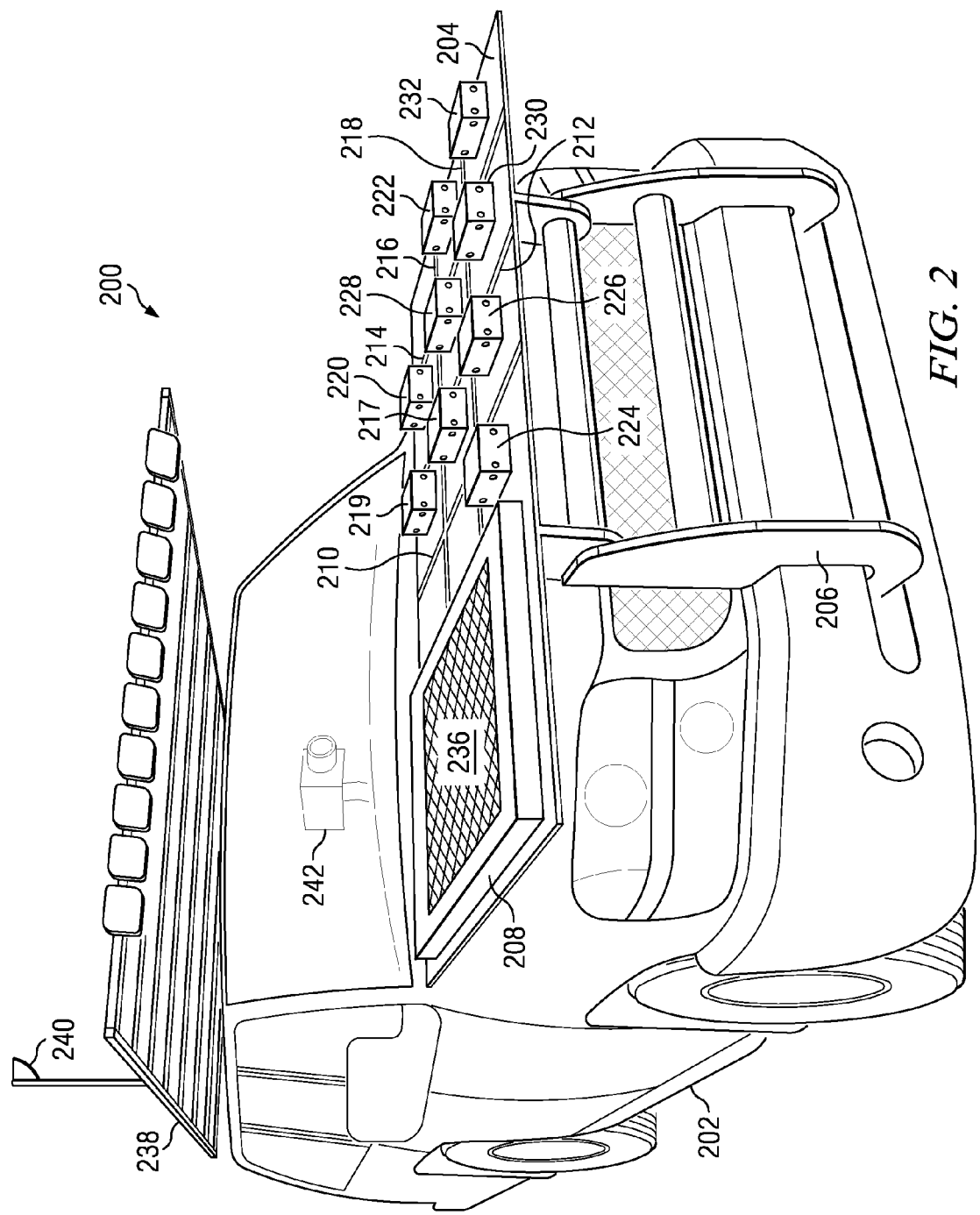
FIG. 2 is a diagram illustrating an impact test system in accordance with an advantageous embodiment.

With reference now to FIG. 2, a diagram illustrating an impact test system is depicted in accordance with an advantageous embodiment. In this example, impact test system 200 is an example of one implementation or embodiment of impact test system 100 in FIG. 1.

In this example, impact test system 200 includes vehicle 202, which takes the form of a utility vehicle. As illustrated, test bed 204 in mounted on hood 206 of vehicle 202. In this particular example, mounting fixture 208 is located on test bed 204. Markers 210, 212, 214, 216, and 218 also are present on test bed 204, in this example. As illustrated, these markers form a grid on test bed 204. Dynamic force sensors 219, 220, 222, 224, 226, 228, 230, and 232 are mounted on test bed 204 within markers 210, 212, 214, 216, and 218.

In this particular example, test specimen 236 takes the form of a composite, flat, honeycombed panel. Of course, test specimen 236 may take other forms. For example, test specimen 236 may be a curve laminate, roofing material, or some other suitable specimen. Impact test system 100 also includes atmospheric instrument system 238 as well as hail catcher 240. In this example, hail catcher 240 is located on the rear of vehicle 202.

As can be seen, in this illustrated example, video camera 242 is located within the interior of vehicle 202. Vehicle 202 also may include a data processing system, which is not shown in this example.

This illustration of impact test system 200 is provided as an example of one manner in which an impact test system may be implemented. This example is not meant to limit the manner in which other impact test systems may be constructed. For example, in other advantageous embodiments, test bed 204 may be located on the rear of vehicle 202. In yet other embodiments, vehicle 202 may take other forms. For example, vehicle 202 may be a pickup truck, a bus, a helicopter, or some other suitable vehicle.

Figure 3:
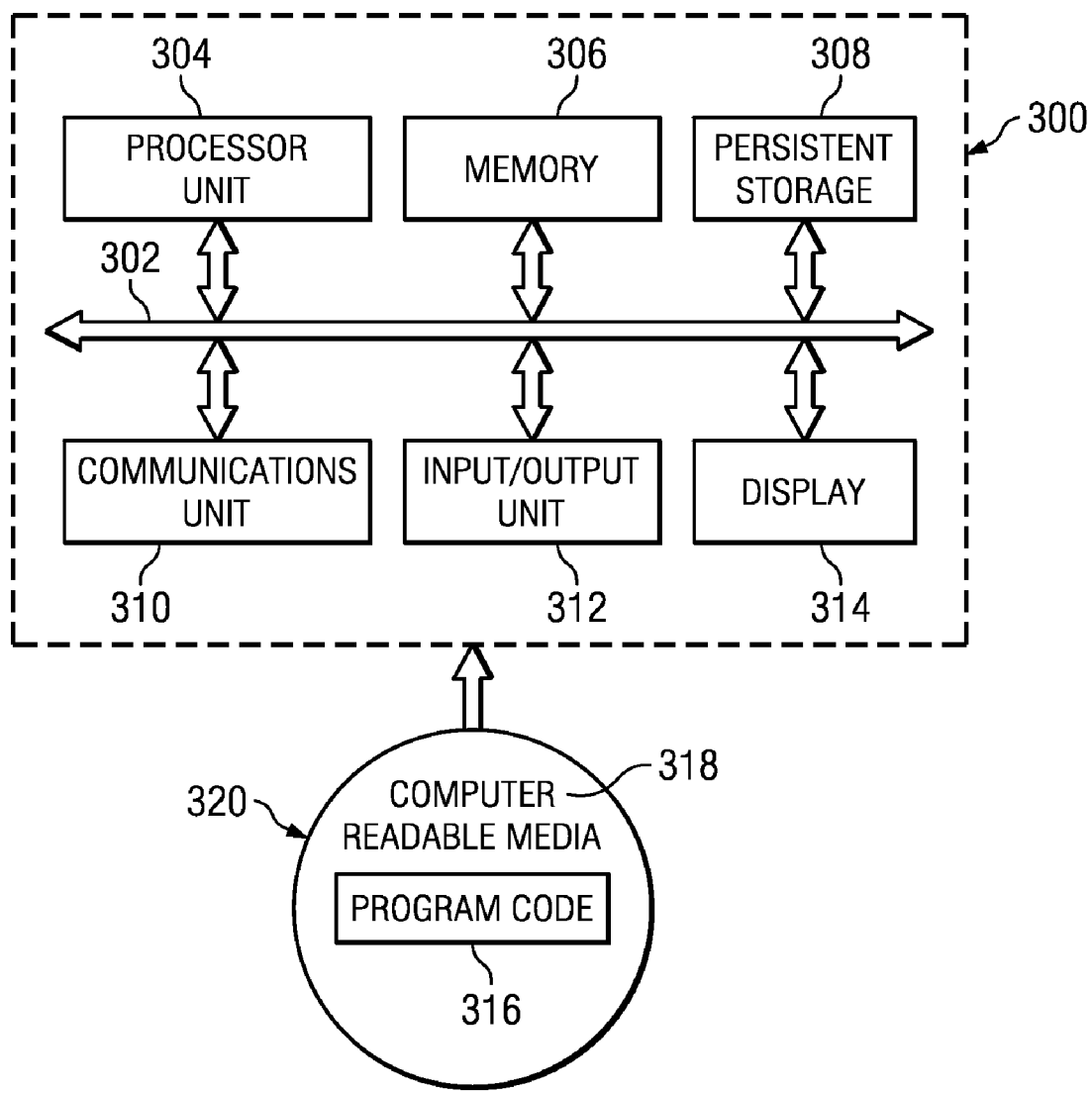
FIG. 3 is a diagram of a data processing system in accordance with an advantageous embodiment.

Turning now to FIG. 3, a diagram of a data processing system is depicted in accordance with an advantageous embodiment. Data processing system 300 is an example of data processing system 124 in FIG. 1. Data processing system 300 may be used to collect the data gathered from various sensors and instruments located within impact test system 100 in FIG. 1. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices.

For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. Input/output unit 312 may be connected to devices such as, for example, dynamic force sensors 108, atmospheric instrument system 114, video camera 120, and other suitable devices in impact test system 100 in FIG. 1. Input/output unit 312 also may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308.

In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

Figure 4:
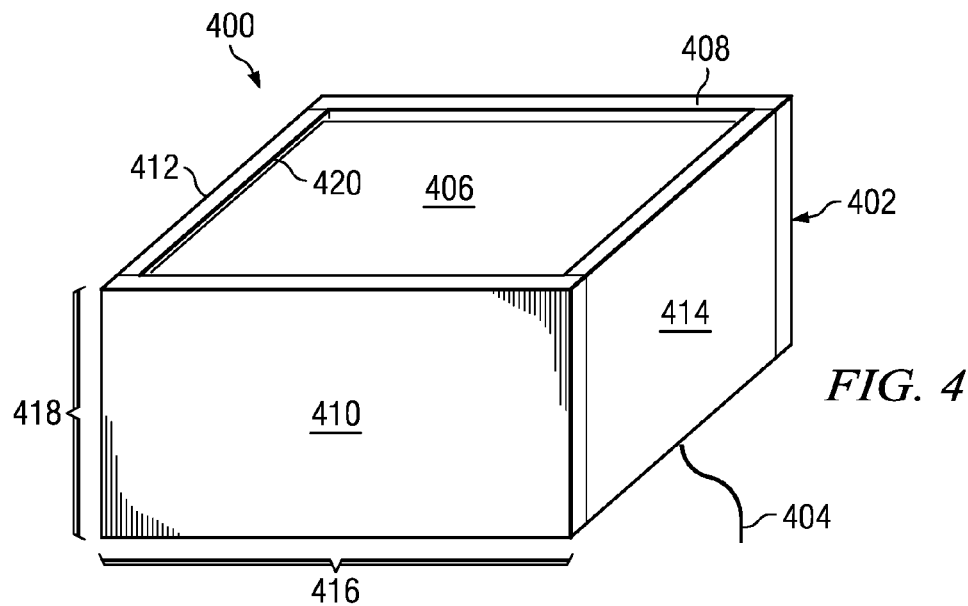
FIG. 4 is a diagram of a dynamic force sensor in accordance with an advantageous embodiment.

Turning now to FIG. 4, a diagram of a dynamic force sensor is depicted in accordance with an advantageous embodiment. In this example, dynamic force sensor 400 is an example of a dynamic force sensor that may be used to implement a dynamic force sensor in dynamic force sensors 108 in FIG. 1. In this example, dynamic force sensor 400 is a piezo-electric force transducer.

Dynamic force sensor 400 has housing 402, which contains various components for detecting changes in force over time. Connector 404 may be connected to a data processing system, such as data processing system 300 in FIG. 3. Surface 406 is the surface on which force may be measured as hail stones impact surface 406.

Housing 402 includes panels 408, 410, 412, and 414. In these examples, these panels take the form of metal plates. Panels 408, 410, 412, and 414 may be around ⅛ inches thick. These panels may be made of aluminum. Of course other materials may be used depending on the particular implementation. For example, steel, plastic, or some other suitable material may be used for panels 408, 410, 412, and 414. In this example, panel 410 has a length of around four inches in section 416, and a length of around 2.1 inches in section 418. The other panels have similar dimensions.

As can be seen, in this example, panels 408, 410, 412, and 414 protrude above surface 406. This design may prevent oblique impacts from damaging surface 406. Further, sealant may be applied around perimeter 420 around surface 406 at the edges meeting panels 408, 410, 412, and 414. The sealant may prevent moisture from entering housing 402.

Figure 5:
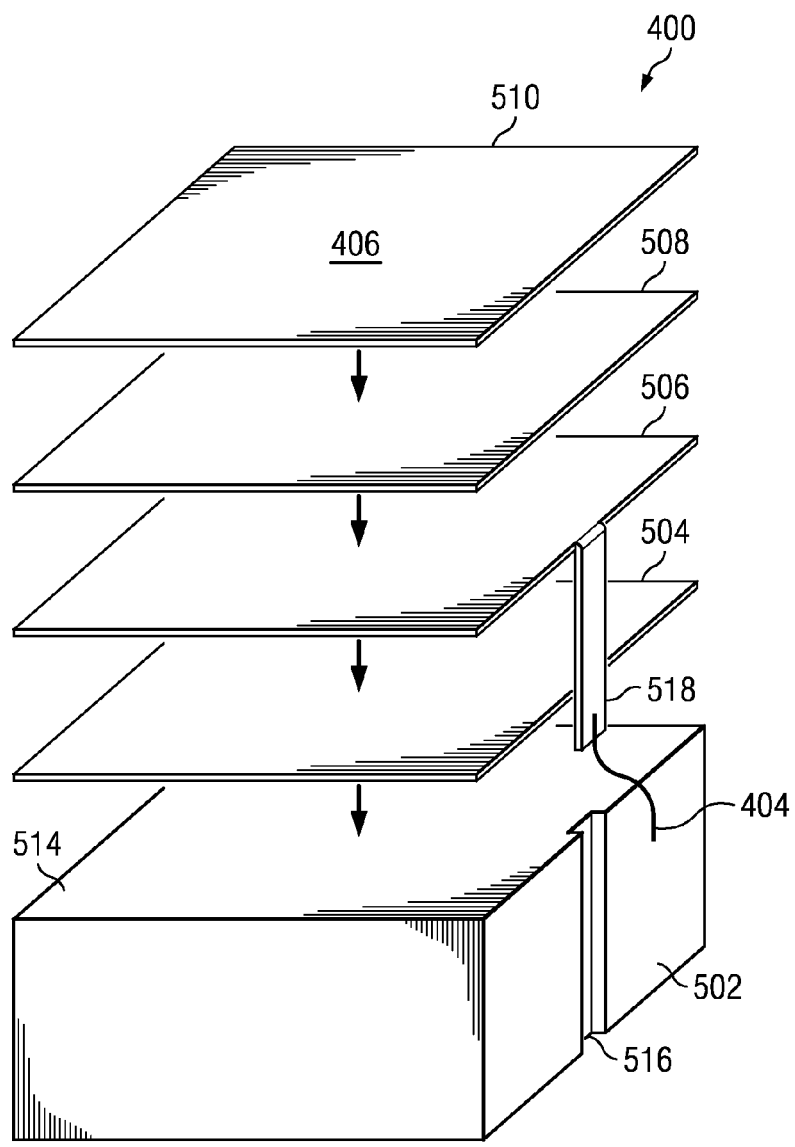
FIG. 5 is an exploded view of a portion of a dynamic force sensor in accordance with an advantageous embodiment.

With reference now to FIG. 5, an exploded view of a portion of a dynamic force sensor is depicted in accordance with an advantageous embodiment. In this example, dynamic force sensor 400 is illustrated without panels 408, 410, 412, and 414.

Dynamic force sensor 400 includes base block 502, adhesive transfer tape 504, piezo-electric film 506, adhesive transfer tape 508, protective sheet 510, and connector 404. In this example, base block 502 may have dimensions of around four inches by around four inches by two inches. Base block 502 should be sufficiently stiff to prevent bending motions from inducing spurious signals due to in-plane strains in the force sensing element such as piezo-electric film 506. Base block 502 may be made of various materials, such as, for example, aluminum, steel, plastic, or some other suitable material. Of course, any other material that may provide a base of support for dynamic force sensor 400 also may be used.

In these examples, adhesive transfer tapes 504 and 508 have adhesive on both sides. Adhesive transfer tape 504 may be used to secure piezo-electric film 506 to surface 514 of base block 502. Adhesive transfer tape 508 secures protective sheet 510 to piezo-electric film 506. Protective sheet 510 forms surface 406. Protective sheet 510 provides a protective layer over piezo-electric film 506. Protective sheet 510 may prevent damage from occurring to piezo-electric layer 506, while permitting piezo-electric layer 506 to detect dynamic forces that may occur in response to an impact from a hail stone.

The dimensions of adhesive transfer tape 504, piezo-electric film 506, adhesive transfer tape 508, and protective sheet 510 are around four inches wide by four inches deep. In this example, piezo-electric film 506 may be implemented using a metalized piezo film sheet having part number 3-1004347-0, which is available from Measurement Specialties, Inc. Of course, any type of piezo-electric film may be used that is capable of measuring the applied dynamic force sufficiently rapidly to resolve the peak force or any other features associated with the dynamic force history.

In this example, protective sheet 510 is a mylar protective sheet. Adhesive transfer tapes 504 and 508 may be implemented using 3M adhesive transfer tape 9458, which is available from 3M Company. This type of tape in around 0.001 inches thick and provides good adhesion to various components.

In these examples, base block 502 includes channel 516, which is shaped to allow lead 518 and piezo-electric film 506 to fit within channel 516. Connector 404 is connected to lead 518 to provide connections to a data processing system to detect changes in force. These changes in force generate electric signal through lead 518. The voltage may change in a manner that is directly proportional to applied force on piezo-electric film 506 in response to impacts on protective sheet 510.

The illustration of dynamic force sensor 400 in FIGS. 4 and 5 are not meant to imply limitations on the manner in which dynamic force sensors may be implemented. This illustration is provided as one manner in which a dynamic force sensor may be implemented. For example, other dynamic force sensors may have other shapes other than that shown for base block 502. Additionally, force sensing elements other than piezo-electric film may also be used. For example, piezo resistive elements or pressure-sensitive films may be used in other embodiments.

Additionally, other components may be used other than those illustrated. For example, instead of using adhesive transfer tape, an adhesive may be sprayed onto different components to connect protective sheet 510 to piezo-electric film 506 and to connect piezo-electric film 506 to surface 514 of base block 502.

Figure 6:
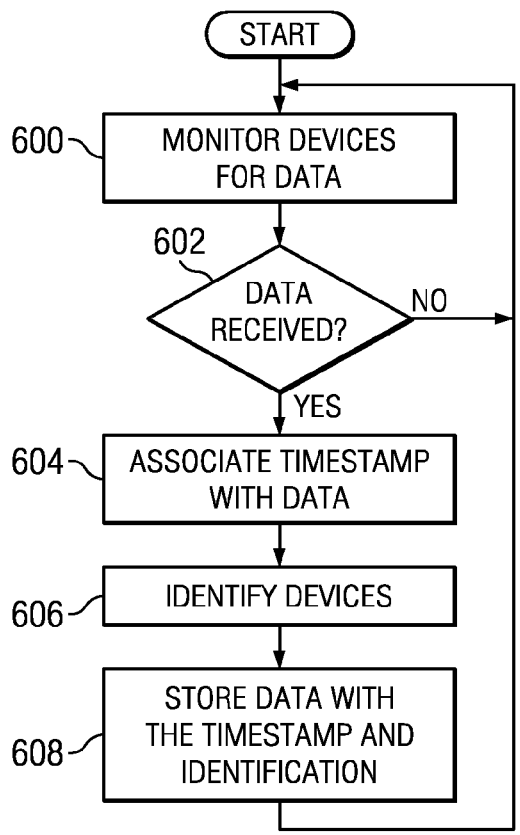
FIG. 6 is a flowchart of a process for collecting hail storm data in accordance with an advantageous embodiment.

With reference now to FIG. 6, a flowchart of process for collecting hail storm data is depicted in accordance with an advantageous embodiment. In this example, the process in FIG. 6 may be implemented in a data processing system, such as data processing system 300 in FIG. 3.

The process begins by monitoring devices in the impact test system for data (operation 600). These devices may include, for example, dynamic force sensors, an atmospheric instrument system, a video camera, and other suitable devices. A determination is made as to whether data has been received from any of the devices (operation 602). If data has not been received, the process returns to operation 600 to continue monitoring for data.

When data is received in operation 602, a timestamp may be associated with the data (operation 604). By associating a timestamp with data received from the different devices, correlations and analysis may be made for the different types of data.

For example, force data received from a dynamic force sensor may be correlated and analyzed with a video of a hail stone impacting the dynamic force sensor. This video may be used to identify the orientation of the hail stone. With this type of correlation being possible, an identification of the impact force based on the angle of the hail stone impacting the dynamic force sensor may be made.

The process identifies the devices from which the data has been received (operation 606). This information also may be used to correlate different types of data. For example, an identification of the dynamic force sensor detecting the impact may be used to identify the orientation at which the impact occurred from video generated by a video camera.

The identification may take various forms. For example, the identification may be a numeral, a character, a set of alphanumeric characters, or some other identification scheme that allows for unique identification of different components within the impact test system. The process stores the data with the timestamp and identification (operation 608).

The process then returns to operation 600. In theses examples, the data may be stored in a storage device within the data processing system. In other advantageous embodiments, instead of storing the data in operation 608, the data may be transmitted to a remote location for processing. This data forms impact data in these examples.

Figure 7:
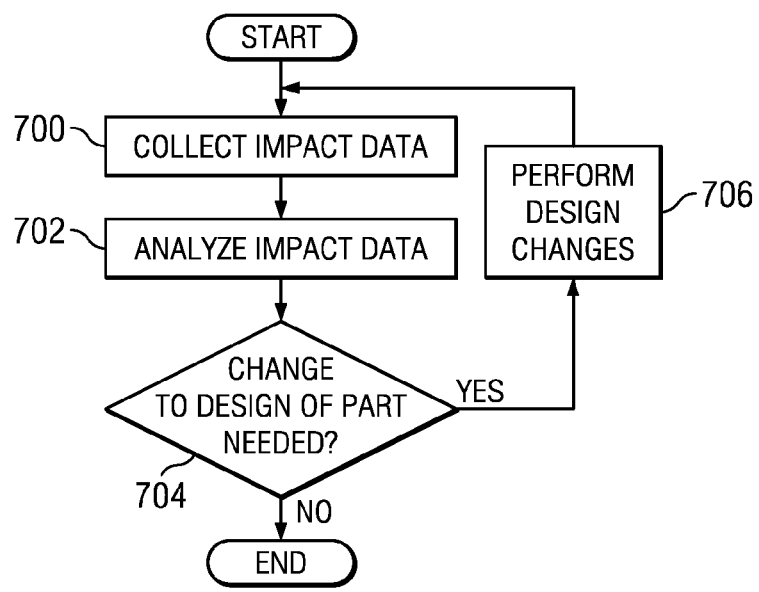
FIG. 7 is a flowchart of a process for analyzing impact data and making design changes in accordance with an advantageous embodiment.

With reference now to FIG. 7, a flowchart of a process for analyzing impact data and making design changes is depicted in accordance with an advantageous embodiment. On or more steps in FIG. 7 may be implemented in a data processing system similar to data processing system 300 in FIG. 3.

The process begins by collecting impact data (operation 700). The impact data may be collected from an impact test system, such as impact test system 100 in FIG. 1, using the process illustrated in FIG. 6. Further, the collection of impact data in operation 700 may be collected from multiple impact test system which may be located in the same hail storm or different hail storms. This data may be collected from a single storm or from multiple storms in which impact data is collected. Operation 700 may be performed by the actual collection of data or by receiving data from impact test systems.

The process analyzes the impact data (operation 702). Operation 702 may include various analyses and/or calculations such as, for example, calculating the force generated by hail stones. The process may correlate the force to hail stone size. The hail stone size may be correlated to force based on the video taken of the hail stone. From the video, the size and orientation of impacts may be identified.

Further, analysis of the composition of hail stones also may be made from hail stones collected on site where the impacts occur. This analysis also may include an identification of damage that may or may not have occurred to any test specimens in the impact test system. Operation 702 may include these and other types of analysis. The specific types of analysis may vary depending on the particular implementation.

A determination is made as to whether a change in the design of the part is needed (operation 704). This determination may be made in a number of different ways. For example, if no damage occurred to the test specimen, a design change may not be needed. In other advantageous embodiments, some level of deformation or damage may be acceptable without needing a design change.

If a design change is needed, a design change is performed (operation 706). This operation includes changes to various parameters such as, for example, a type of material and/or the thickness or gauge of the material. Operation 706 may be performed using the same data processing system or a different data processing system that is specialized for designing parts.

The process then returns to operation 700 to collect additional impact data with the design change. If a design change is not needed in operation 706, the process terminates.

In this manner, an impact test system, such as impact test system 100 in FIG. 1, may be used to collect data about hail stones from an in place or in-situ manner that allows for more accurate predictions as to how various components may perform. This type of data collection is more accurate than simulated tests using balls or hail stones formed using man made composites and ice.

In addition, the data collected from impact test system 100 in FIG. 1 also may be used to identify the composition of hail stones. With this information, more accurate man made hail stones may be generated for testing in a laboratory. Additionally, this information also may be used to generate computer based simulations of hail stones to simulate impacts on a modeled component.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a test bed mounted on a vehicle;
a plurality of dynamic force sensors mounted on a first portion of the test bed, each of the plurality of dynamic force sensors mounted within a square of a grid;
a plurality of visual markers located on the test bed in a grid; and
a video recorder mounted inside the vehicle and directed towards the test bed to record a plurality of digital images of a plurality of impacts of the plurality of hail stones on the test bed along with the plurality of visual markers in the grid to identify, in conjunction with the plurality of markers within the plurality of digital images of the plurality of hail and of the plurality of visual markers, the orientation of each of the plurality of hail stones when each of the plurality of hail stones impact the test bed;
wherein each of the plurality of dynamic force sensors has a housing for containing a plurality of sensors connected to a piezo-electric film to detect changes in a force over time where the force is detected through a protective sheet over the piezo-electric film and is transmitted to a data processing system along with the plurality of digital images from the video recorder to calculate, for each of the plurality of hail stones, an impact force based on a correlation of the orientation with a force data from the dynamic force sensors.

2. The apparatus of claim 1 further comprising:
a plurality of temperature sensors, each of the plurality of temperature sensors integrated into one of the plurality of dynamic force sensors to collect a plurality of temperatures, each of the plurality of temperatures being a hailstone temperature for each of the plurality of hailstones that impact the plurality of dynamic force sensors;
a container capable of holding a set of hail stones; and
an atmospheric instrument system mounted on the vehicle.

3. The apparatus of claim 2 further comprising:
wherein the data processing system collects data from the plurality of dynamic force sensors, the atmospheric instrument system, and the video recorder.

4. The apparatus of claim 1 further comprising:
a mounting fixture attached to the test bed; and
a test specimen mounted a second portion of the test bed;
wherein the test bed is mounted on the hood.

5. An impact test system comprising:
a video recorder mounted inside a vehicle configured to record a plurality of digital images of a plurality of hail stones impacting a grid on a test bed mounted outside of the vehicle; and
a data processing system that collects a plurality of data from a plurality of dynamic force sensors on the test bed and said plurality of digital images from the video recorder to calculate from the plurality of data, for each of the plurality of hail stones, an impact force based on a correlation of an orientation from the plurality of digital images with a force data from plurality of data from the dynamic force sensors.

6. The impact test system of claim 5 further comprising:
wherein the plurality of dynamic force sensors are mounted to a first portion of the test bed, each of the plurality of dynamic force sensors mounted within a square of the grid, wherein each of the plurality of dynamic force sensors detects any force generated by an impact of a hailstone on the square of the grid; and
wherein the data processing system identifies a set of terminal velocities for the set of hail stones.

7. The impact test system of claim 5 further comprising:
a plurality of visual markers on the test bed configured to form the grid and to be recorded in the digital images taken by the video camera, wherein the video camera is directed towards the test bed in a manner to record the impact of the plurality of hail stones on the test bed along with the plurality of visual markers and to determine, by the data processing system, in conjunction with the plurality of visual markers within the video, the orientation of each of the plurality of hail stones when each of the plurality of hail stones impact the test bed.

8. The impact test system of claim 5 further comprising:
a plurality of temperature sensors, each of the plurality of temperature sensors integrated into one of the plurality of dynamic force sensors to collect a plurality of temperatures, each of the plurality of temperatures being a hailstone temperature for each of the plurality of hailstones that impact the plurality of dynamic force sensors;

wherein the data processing system collects a plurality of data from the plurality of temperature sensors when a hailstone impacts a dynamic force sensor; and wherein the data processing system identifies a size of each of the plurality of hail stones.

9. The impact system of claim 5 further comprising:

a mounting fixture capable of holding a test specimen on a second portion of the test bed, wherein the test specimen is a composite test panel selected from one of a flat composite test panel and a composite structure with contours.

10. A method for collecting hail storm data, the method comprising:

placing a vehicle in a hail storm, wherein the vehicle has a video recorder mounted inside the vehicle that captures a plurality of digital images of a plurality of impacts of a plurality of hail stones on a plurality of dynamic force sensors on a grid of a test bed mounted on an outside portion of the vehicle; and calculating, by a processor of a data processing system connected to the plurality of dynamic force sensors and to the video recorder, for each of the plurality of hail stones that impact a dynamic force sensor on the grid, an impact force based on a correlation of the orientation from the plurality of digital images with a force data from the plurality of data from the plurality of dynamic force sensors.

11. The method of claim 10 further comprising:

directing a lens of the video recorder through a windshield of the vehicle and towards the test bed to record the impact of the plurality of hail stones on the test bed along with a plurality of visual markers on the test bed;

identifying, by the processor of the data processing system, in conjunction with plurality of digital images containing the plurality of visual markers within the video, the orientation of each of the plurality of hail stones when each of the plurality of hail stones impact the test bed.

* * * * *